UNITED STATES PATENT OFFICE.

ALBERT HAYES, OF NEW YORK, N. Y., ASSIGNOR TO CARNOT DEVELOPMENT CORPORATION, A CORPORATION OF NEW YORK.

PROCESS FOR THE TREATMENT OF IRON OR STEEL.

1,241,112.      Specification of Letters Patent.      Patented Sept. 25, 1917.

No Drawing.      Application filed March 31, 1916. Serial No. 88,046.

*To all whom it may concern:*

Be it known that I, ALBERT HAYES, a citizen of the United States, residing at New York, in the county of New York, State of New York, have invented certain new and useful Improvements in Processes for the Treatment of Iron or Steel, of which the following is a description.

My invention relates to a process for the treatment of iron or steel for the purpose of imparting to it increased toughness or tensile strength and to the product produced by such process.

It is well known that in the treatment of steel by heating and quenching in liquid the result produced is somewhat dependent on the character of the liquid in which the treated steel is quenched—for instance,—if the heated steel is quenched in oil, the result is different from that produced by quenching it in water at the same heat. It has also been found that if certain chemicals are added to the water in which the heated steel is quenched a different result is produced from that produced by quenching in water not having such chemicals in solution. Various chemical solutions have been prepared and various results as regards improvement of the steel, particularly as regards toughness or tensile strength have been secured. It is the object of my present invention to produce a process for the treatment of steel or iron by heating and quenching by the use of which, by a single operation, the toughness or tensile strength of the steel or iron will be greatly increased, and at the same time, in case of steel, such degree of temper as may be desired will be imparted to it. And it is a further object of my invention to produce by such treatment steel having greatly increased toughness or tensile strength.

With these objects in view, my invention consists in the process and product hereinafter described and claimed.

The characteristic element of the solution made use of in carrying out the process of my present invention is fluorin, but for the best results I use this in a solution containing also sal-ammoniac, chlorid of sodium (common salt) and chlorin, and generate the fluorin in this solution from a fluorid, such as fluor spar, by the addition of hydrochloric acid.

In preparing the solution for the treatment of steel or iron, I dissolve three ounces of sal-ammoniac and three ounces of common salt in a gallon of water and add to this one-twentieth of an ounce of fluorid, such as powdered fluor spar, and then add about two per cent. of muriatic (hydrochloric) acid and cool the solution. Subsequently, I heat the solution to about 150 degrees Fahrenheit and add so much chlorin in the form of gas or liquefied as the solution will take up. The solution is then ready for use.

In carrying out my process, I heat the steel or iron to be treated to a low red heat, say from 500 to 600 degrees Fahrenheit, being careful to see that it is heated throughout to the same temperature, and I then quench it in the solution. The result of quenching it in the solution is to rearrange the molecules and to probably also change their composition, throughout the mass of the metal, so that the metal will present a fibrous appearance and can be broken only with great difficulty, its tensile strength being greatly increased. By regulating the heat of the solution between say 98 degrees and 200 degrees Fahrenheit, I am able by the single quenching to give steel a hard or soft temper, so that no reheating is necessary for annealing or hardening. Steel so treated may, however, be reheated for tempering without destroying the fibrous character imparted to it by quenching in the solution.

The solution used as above described affects the entire mass of the steel or iron subjected to its action, provided, of course, it is uniformly heated throughout its mass. If it is desired to have the metal made tough and fibrous only exteriorly leaving the interior crystalline, this result may be brought about by quenching it in the solution before it is heated throughout its mass.

The fluorin set free by the action of the hydrochloric acid on the fluorid used seems to have a permanent effect upon the silica present in the steel or iron, either to dissolve it or to change its character so as to leave the steel or iron free from brittleness. It is possible also that the fluorin may produce its effect by its action on the sulfur present in the steel or iron; and while it is clear that the fluorin is the important element of the solution, it seems to be clear that its action is modified and facilitated by the presence of the chlorin.

It will, of course, be understood that the process is not dependent on the precise proportion of the fluorin or other chemicals used in the solution; the essential feature being subjecting the steel or iron while heated to the action of the fluorin.

I do not herein claim the solution above described, that forming the subject matter of a separate application filed by me March 31, 1916, Serial No. 88,047.

Having thus described my invention, what I claim is:

1. The herein described process of treating iron or steel which consists in heating the iron or steel and quenching it in a solution containing sal-ammoniac, common salt, a substance capable of yielding fluorin and a reagent.

2. The herein described process of treating iron or steel which consists in heating the iron or steel and quenching it in a heated solution containing sal-ammoniac, common salt, a substance capable of yielding fluorin and a reagent.

This specification signed and witnessed this 29th day of March A. D. 1916.

ALBERT HAYES.